United States Patent [19]
Julien

[11] Patent Number: 5,868,013
[45] Date of Patent: Feb. 9, 1999

[54] HIGH SECURITY LOCK

[75] Inventor: Gerald J. Julien, Puyallup, Wash.

[73] Assignee: Nitinol Technologies, Inc., Edgewood, Wash.

[21] Appl. No.: 69,544

[22] Filed: Jun. 1, 1993

[51] Int. Cl.$^6$ ............................................. E05B 67/22
[52] U.S. Cl. .......................... 70/38 A; 70/417; 70/38 C
[58] Field of Search .................. 292/DIG. 66; 70/2, 70/6, 7, 18, 20–22, 24–26, 35, 38 A–38 C, 51–54, 277, 278, 416, 417; 403/404

[56] References Cited

U.S. PATENT DOCUMENTS

| | | | |
|---|---|---|---|
| 1,844,569 | 2/1932 | Fairchild | 70/38 C |
| 2,407,406 | 9/1946 | Dutton | 70/38 B |
| 3,742,739 | 7/1973 | Hickman | 70/38 B |
| 3,817,063 | 6/1974 | Williams | 70/24 |
| 3,857,262 | 12/1974 | Sidiropoulos | 80/38 C X |
| 3,901,057 | 8/1975 | Coley, Sr. | 70/20 |
| 3,999,790 | 12/1976 | Rogen | 292/DIG. 66 X |
| 4,008,589 | 2/1977 | Harrell | 70/18 X |
| 4,098,100 | 7/1978 | Wah | 70/38 A |
| 4,118,961 | 10/1978 | Lee | 70/18 X |
| 4,389,862 | 6/1983 | Hastings | 70/2 |
| 4,561,272 | 12/1985 | Goldstein | 70/417 |
| 4,598,562 | 7/1986 | Freeman | 70/417 X |
| 4,753,465 | 6/1988 | Dalby | 292/DIG. 66 X |
| 5,010,949 | 4/1991 | Dehaine | 403/404 X |
| 5,024,549 | 6/1991 | Dalby | 403/404 |
| 5,095,595 | 3/1992 | Stella et al. | 403/404 X |
| 5,113,674 | 5/1992 | LiCausi | 70/18 X |
| 5,129,753 | 7/1992 | Wesley et al. | 403/404 X |
| 5,181,403 | 1/1993 | Lii | 70/38 C |
| 5,372,018 | 12/1994 | Smith | 70/18 |

*Primary Examiner*—Suzanne Dino Barrett
*Attorney, Agent, or Firm*—J. Michael Neary

[57] ABSTRACT

A method high security locking includes inserting a shackle having two ends into a lock body having openings for receiving the ends of the shackle. A latch in the lock body has a catch that snaps into engagement with the shackle for securing at least one end of the shackle in the body. The latch may be released to allow the one end of the shackle to move clear of the body. to open the lock. The shackle is made of a shape memory effect alloy having a characteristic that its yield strength increases when work is impressed on it, so that cutting or breaking the shackle with common tools is more difficult and time consuming than with other shackle materials. The lock thus provides a level of security substantially superior to conventional locks.

20 Claims, 8 Drawing Sheets

Fig. 8

HIGH SECURITY LOCK

This invention relates to locks, and more particularly to a lock that is extremely difficult to cut or break.

Modern locks, with few exceptions, are designed to deter casual theft, but seldom offer any significant protection. These locks are so easily broken or cut that the only real value they offer is to expose the fact that a theft is being attempted, and to reveal the fact that the protected assets have been broken into.

Presently available conventional automobile ignition locks do not constitute a significant deterrent to auto theft. The ignition lock is easily broken out of its housing with a slide hammer, so it deters auto theft (if at all) only to casual thieves such as joy riders. The other auto locks such as steering wheel bars and brake bars are easily defeated by merely cutting a small section out of the steering wheel, a simple task with a hack saw. An effective, inexpensive and conveniently used auto lock that would effectively prevent auto theft would be an enormous contribution to the fight against a serious national problem.

Padlocks are the most common type of lock in use and are the most easily defeated. A simple bolt cutter easily cuts through the shackle of all common padlocks in use today, and if a bolt cutter is not available, a blow with a hammer is usually sufficient to break the shackle. Many millions of dollars worth of money and equipment are stolen each year by the simple act of cutting through the shackle of a padlock with a bolt cutter. The commonly advertised "high security" locks are only marginally more secure than the other locks not so denominated and are also easily and quickly cut or broken. A padlock that would offer significant protection against breaking or cutting, and thereby actually deter or prevent theft would constitute an important contribution toward a long standing problem and could capture a large share of the padlock market.

SUMMARY OF THE INVENTION

Accordingly, it is an object of this invention to provide a lock that cannot be cut or broken by ordinary tools.

Another object of the invention is to provide a method of securing valuable assets such that they are more secure from theft by thieves using ordinary tools.

Yet another object of the invention is to provide a lock that offers real protection against theft by being resistant to every known common form of breaking or cutting heretofore used to defeat locks.

A further object of the invention is to provide an automobile ignition lock cover that effectively deters auto theft.

Another object of the invention is to provide a padlock that can be made smaller than conventional padlocks and which is light weight, corrosion resistant, is highly resistant to breaking, cutting, and even burning with a torch.

These an other objects of the invention are attained in a lock having a shackle and a body for securing across the ends of the shackle with a latching device that can be released by a key or by a combination. The shackle and the catch of the latch are made of a shape memory alloy such as Nitinol. Another embodiment includes a cover that can be placed over the ignition lock of a vehicle and secured in place when the vehicle is left unattended. The cover is hardened steel and the lock which secures it in place includes a shackle and a catch made of a shape memory alloy, preferably Nitinol, that is impossible to break or cut with ordinary tools.

DESCRIPTION OF THE DRAWINGS

The invention, and its many attendant objects and advantages will become better understood upon reading the following description of the preferred embodiments in conjunction with the drawings, wherein.

DESCRIPTION OF THE PREFERRED EMBODIMENTS

Figure 1:
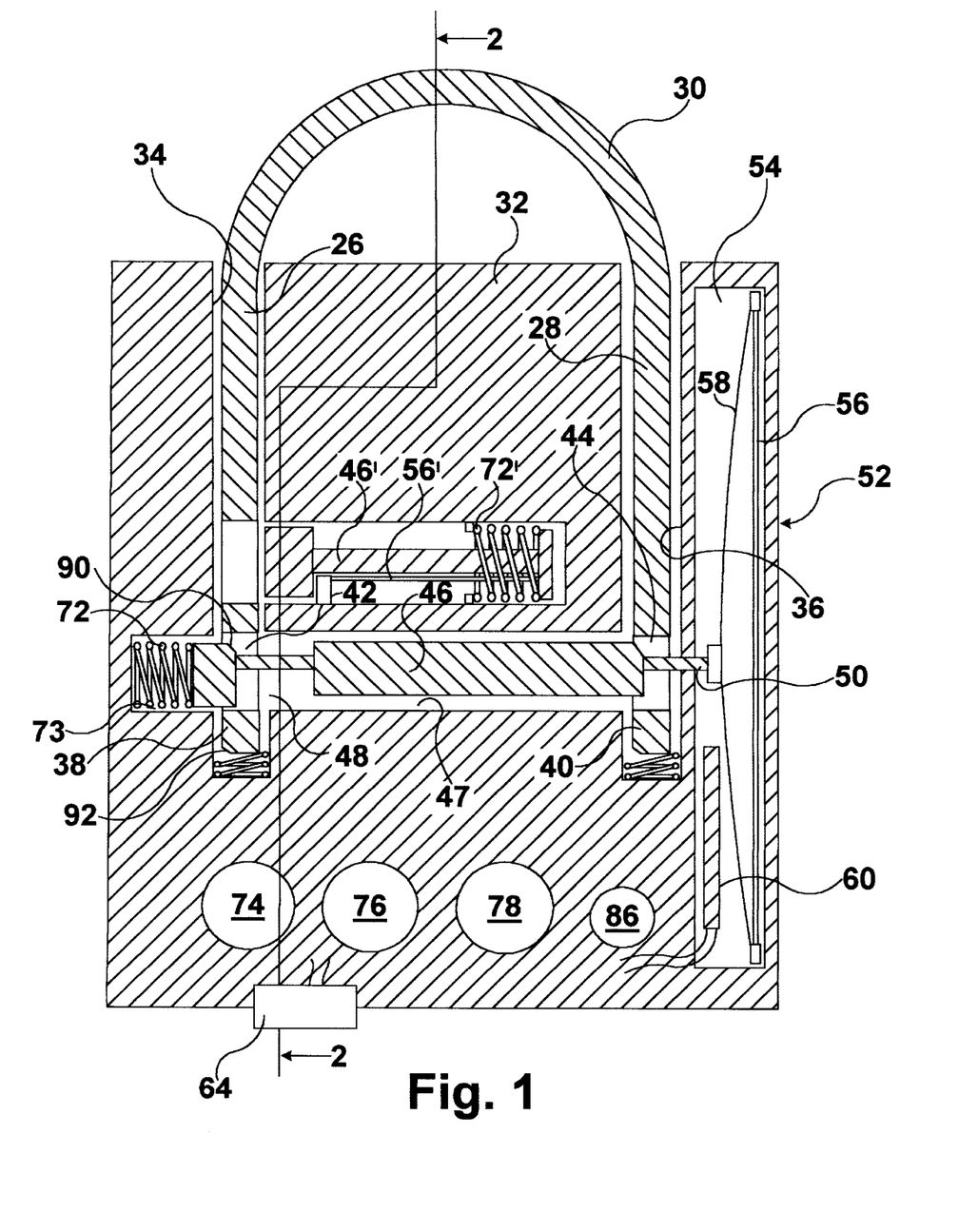
FIG. 1 is a sectional elevation of a padlock, in a locked position, according to this invention.
Figure 2:
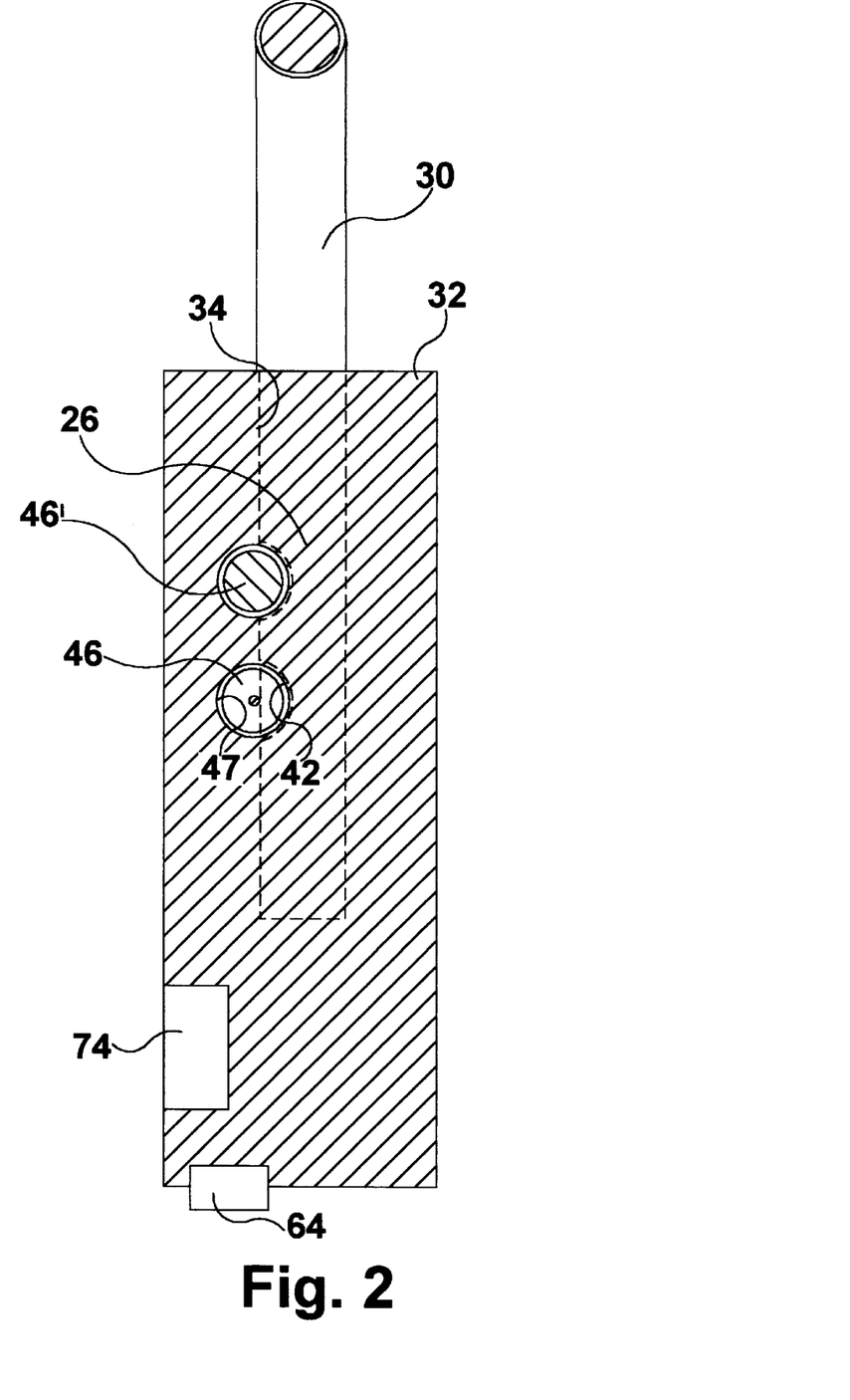
FIG. 2 is a sectional elevation along lines 2—2 in FIG. 1.

Referring now to the drawings, wherein like or primed reference characters refer to identical or corresponding elements, and more particularly to FIGS. 1 and 2 thereof, a padlock is shown having a U-shaped shackle 30 and a body 32. The shackle has two spaced parallel legs 26 and 28, and the body 32 has a pair of spaced parallel bores 34 and 36 which receive the legs 26 and 28 of the shackle 30. Two notches 42 and 44 adjacent the ends 38 and 40 of the two legs 26 and 28 of the shackle 30 receive a catch for securing the shackle 30 in its locked position. In this embodiment, the catch is in the form of a locking pin 46 which slides laterally in the body between a locking position shown in FIG. 1 and an unlocking position shown in FIG. 3. Two reduced diameter reliefs 48 and 50 in the locking pin 46, spaced apart therealong a distance equal to the distance between the two legs 26 and 28 of the shackle 30, are aligned with the legs 26 and 28 when the locking pin 46 is shifted to its unlocking position shown in FIG. 3 to allow the solid (unnotched) portions of the shackle leg ends 38 and 40 to pass by the locking pin 46 and be removed from the body 32 to unlock the lock.

The shackle and, preferably, the locking pin are both made of a shape memory effect alloy such as Nitinol, an alloy made principally of nickel and titanium. Nitinol has the peculiar property that its yield strength increases as cold work is impressed on it. For example, Type 55 Nitinol, which has about 55% nickel and about 45% titanium, has a martensitic state with a yield strength of about 8–25 KSI, but during cold working the yield strength can increase to about 250 KSI or possibly 300 KSI. This means that a lock made with a Nitinol shackle would effectively have a yield strength of 250 KSI or higher during an attempt to cut or break the shackle. Type 55 Nitinol also is extremely tough and non-brittle, so that it does not crack or shatter when subjected to impact type forces. Moreover, it has a damping characteristic that enables the material to absorb shock loads without transmitting shock spikes, as do conventional hardened materials, so the stress peaks at the notches 42 and 44 and on the locking pin would never approach the magnitude that they would in a lock with a conventional hardened steel shackle. Finally, Nitinol is inert to most common chemicals so it will not corrode or be subject to defeat by attack with most chemical agents.

This remarkable combination of properties can be utilized to make lock components of Nitinol that are uniquely resistant to attack by thieves and other persons intent on cutting or breaking the lock. Tests on prototype lock components made of Nitinol have shown that large hand operated bolt cutters, of the type often used by thieves to break into a protected enclosure and which easily cut conventional lock materials having a hardness up to about Rockwell 30C to 50C, not only fail to cut the lock shackle of this invention, but are actually badly damaged by the forced engagement with the shackle. The cutting jaws of hydraulically operated cutters used to cut materials having a hardness up to about Rockwell 53C are also severely damaged by attempts to cut the shackle of this invention. It appears that the Nitinol is converted in some manner, not fully understood, to a stress-induced form of martensitic Nitinol that is significantly harder than the hardened tool steel of the bolt cutter jaws. The result, however it is caused, is that the hardened tool steel cutting jaws of the bolt cutter yield against the Nitinol shackle, and the shackle is only slightly dented.

Impacts delivered against Type 55 Nitinol tend to be absorbed because of the remarkable shock absorbing characteristics of the material. A common way to break a padlock is to strike the body of the lock adjacent to its connection to the shackle and along the axis of the legs of the shackle. This concentrates the force of the blow on the notch in the shackle and on the catch which engages the notch. The case hardened shackle is weakest at the notch and will usually break at that point. The Nitinol shackle of this invention, on the other hand, absorbs the blow and resiliently elongates slightly. The elongation absorbs the energy of the impact by converting it to heat, and the elongation constitutes cold work on the material which raises the yield strength to further resist breakage of the shackle. The result is that the impact necessary to break a Nitinol shackle, even one that is one half the diameter of a conventional padlock, is far greater than that which an ordinary thief could exert with a hammer on the lock.

Figure 3:
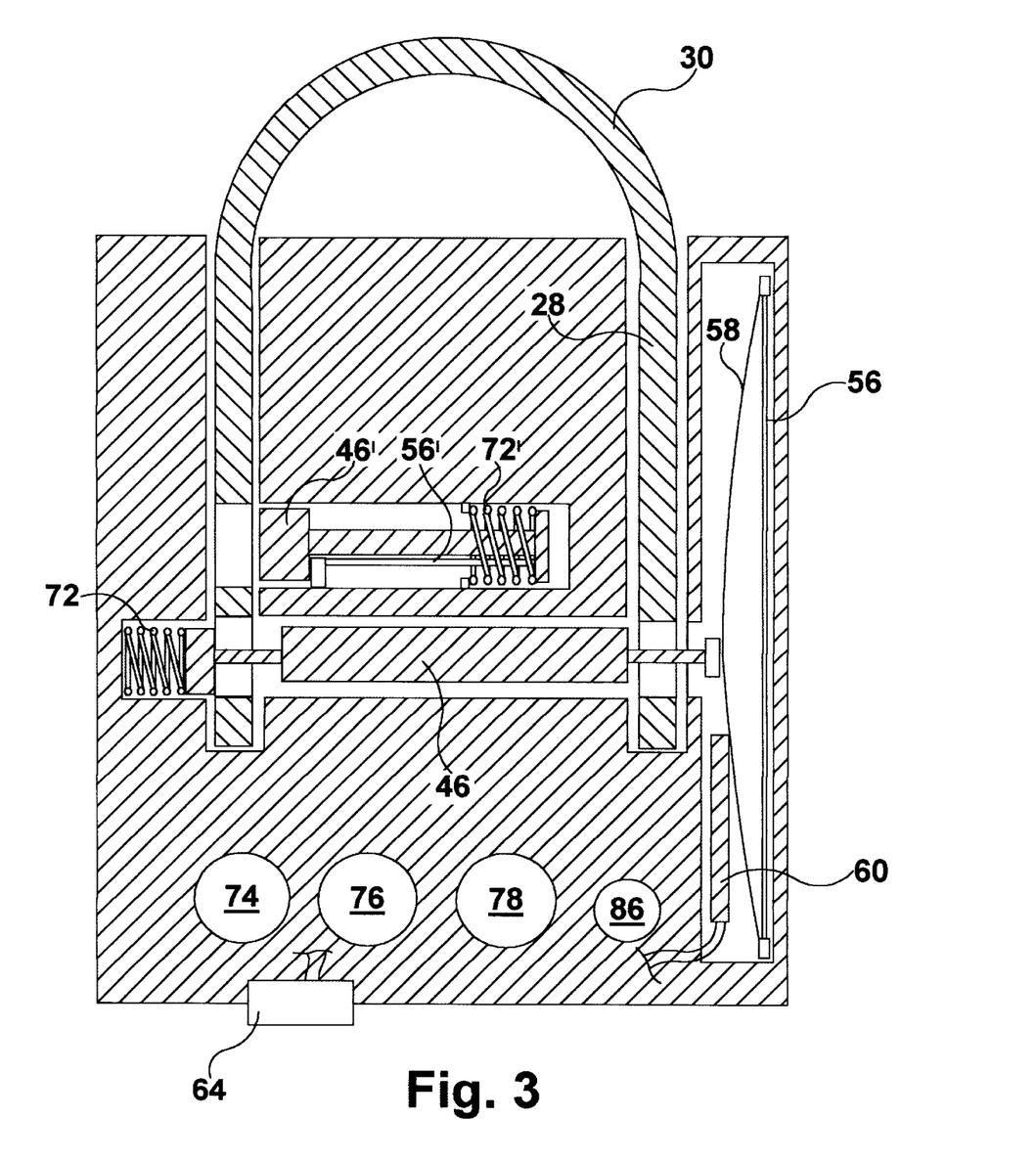
FIG. 3 is a sectional elevation of the padlock shown in FIG. 1, in an unlocked position.

As shown in FIGS. 1–3, the shackle is made of primarily solid monolithic Nitinol. The term "primarily solid monolithic Nitinol shackle" is intended to mean that the shackle is a single homogeneous undifferentiated material throughout, and its primary protective strength is provided by the solid Nitinol, although the shackle could also be painted or have some other decorative finish or non-structural elements common in locks applied.

Although the usual failure mode of conventional locks is breakage of the shackle at the notch, they can also fail by breakage of the catch which engages the notch. The catch is the metal element that can be shifted by the lock tumbler to disengage from the notch and release the shackle for opening the lock. When the catch is broken by a hammer blow, the lock is defeated. In the lock of FIGS. 1–3, the catch is a locking pin of substantial diameter that engages the notches 42 and 44 in both legs 26 and 28 of the shackle 30. For additional assurance against breakage, the locking pin 46 can be made of Nitinol. Like the shackle, the Nitinol locking pin 46 displays the same characteristics that produce such remarkable resistance to breakage or other failure modes.

The resistance to cutting or breakage of padlocks with Nitinol shackles and catches is so great that it may be necessary to restrict their use to applications not involving access by emergency personnel, such as fire fighters or police. Fire fighters are normally equipped with large bolt cutters which they use to cut the locks off of fire doors when they need to enter a burning unoccupied building. Since a padlock made in accordance with this invention would not yield to the usual procedures used to cut or break conventional locks, it would be necessary to provide some other mode of speedy access to the building to prevent it from burning to the ground because the fire fighters could not gain access to put out the fire.

The notches 42 and 44 in the shackle 30 are rounded as shown in FIG. 2 to match the round cross section of the locking pin 46. The round cross section distributes the force at the interface between the shackle 30 and the locking pin 46 uniformly to minimize stress concentration in the event of an attempt to break the lock, and also ensures alignment of the full diameter portions of the locking pin 46 with the notches 42 and 44 when it is shifted to the locking position of FIG. 3. The full diameter portions of the locking pin can be beveled slightly to ensure smooth movement into the notches 42 and 44.

Lateral movement of the locking pin 46 is effected by an actuator 52 disposed in an actuator cavity 54 and connected to the right hand end of the locking pin 46 in FIGS. 1 and 3. The actuator in the first embodiment of the lock is a simple two-element device made of a binary Nitinol element 56 connected between two ends of a curved steel spring 58. Binary Nitinol has a "shape memory" effect wherein it returns to the shape it had before being deformed in its martensitic state when it is heated to above its transition temperature to its austenitic state.

A heater 60 placed in the cavity 54 in close proximity to the Nitinol element 56 is connected to a source of electrical power, such as a battery pack 62 (shown in FIG. 4) through an electrical connector 64 and a combination switch arrangement 66 to raise the temperature of the Nitinol element 56 to above its transition temperature, which causes it to change to its austenitic state and spontaneously revert to the shape it had before it was deformed in its martensitic state. That shape is the shorter configuration shown in FIG. 3. In the austenitic state, the Nitinol has sufficient strength to bend the steel curved spring 58 to the smaller radius curve shown in FIG. 3, moving the Nitinol locking pin 46 to the left in FIG. 1 to the unlocked position shown in FIG. 3. A pair of springs 68 and 70 captured in the bottom of the bores 34 and 36 are provided to pop the shackle up when it is unlocked so the lock behaves in a way similar to the usual opening characteristics of conventional locks.

After the power is shut off to the heater 60 and the Nitinol element 56 has cooled off in temperature to below its transition temperature, it reverts to its low strength martensitic state, in which state the steel curved spring is stronger than the Nitinol element 56 and can stretch the martensitic Nitinol element 56 to the longer configuration shown in FIG. 1. A return spring 72 in a pocket 73 to the left of the locking pin 46 is compressed between the left hand end of the locking pin 46 and the inner end of the pocket 73. The spring 72 biases the locking pin toward the right in FIG. 1, that is, toward the locked position.

The return spring 72 may be made of Nitinol having a lower transition temperature than the Nitinol actuator element 56 to prevent the lock from being opened by the simple expedient of heating it with a torch to actuate the Nitinol actuator 52. If the lock is heated with a torch or the like, the Nitinol spring 72 will pass through its transition temperature sooner than the Nitinol actuator element 56. The shape set in memory in the spring 72 is longer than its compressed shape shown in FIGS. 1 and 3, and the strength of the spring 72 in its austenitic state would be designed to be greater than the strength of the Nitinol actuator element 56, so heating the lock with a torch will merely serve to fix it in its locked position.

Preferably, a secondary locking pin 46' is provided to prevent the lock from being opened by heating with a torch. The second locking pin 46' is normally held in an unlocked position as shown in FIG. 1 by a coil spring 72', but can be pulled into a locked position by a secondary Nitinol actuator 56' if the lock is heated by a torch in an effort to open it. The transition temperature of the secondary Nitinol actuator 56' is lower than the transition temperature of the primary actuator 56, so it will operate before the primary actuator 56 does in the event that the lock is heated with a torch, thereby ensuring that the lock remains locked even if the primary actuator 56 is actuated by heating the lock with a torch. When the lock cools off after being heated, the temperature drops below the transition temperature of the Nitinol actuator element 56' and the spring 72', which is stronger than the Nitinol actuator element 56' in its martensitic state, stretches the Nitinol element 56' while pushing the secondary locking pin 46' to its unlocked position to the right in FIG. 1.

Figure 4:
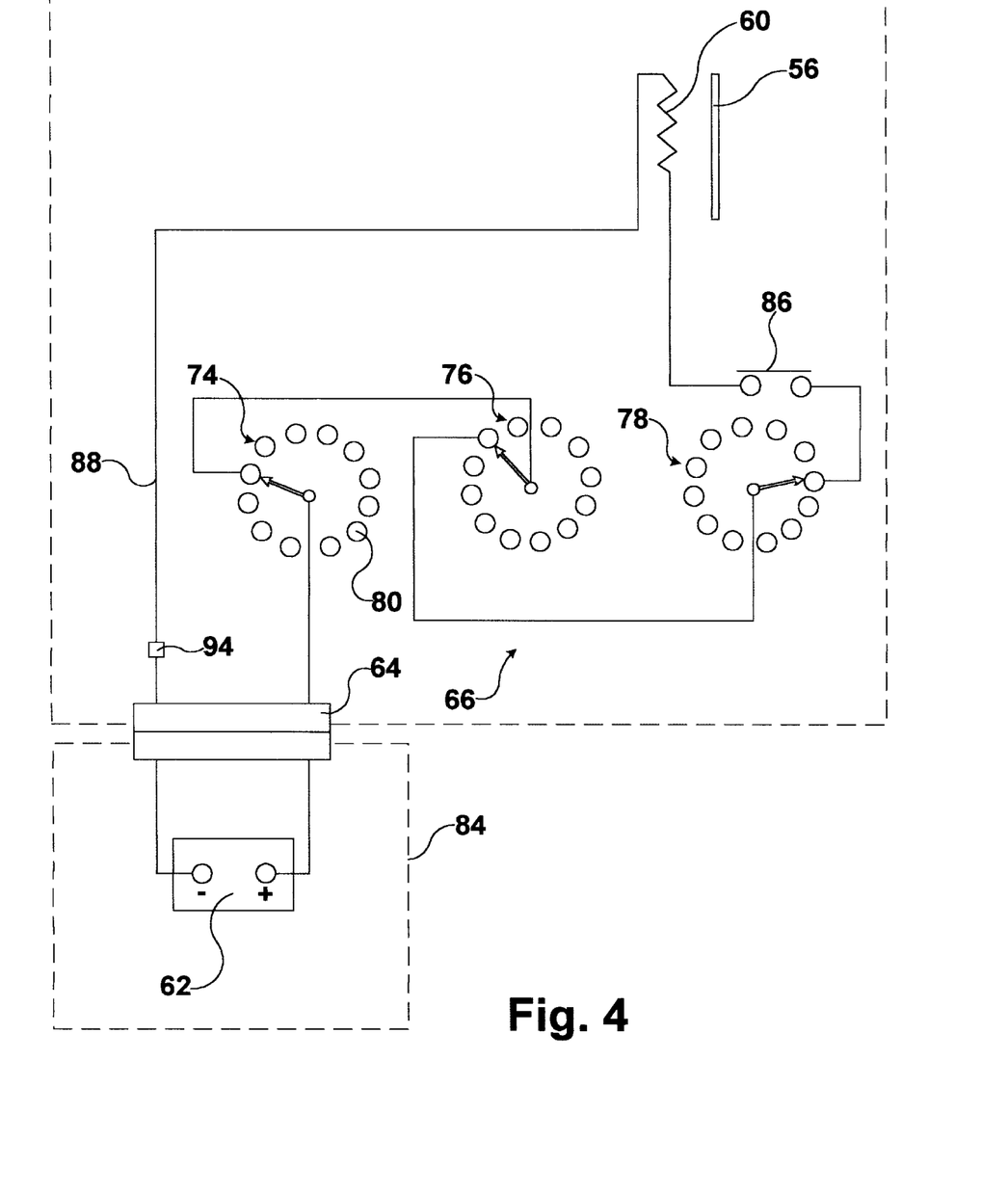
FIG. 4 is an electrical schematic of a control circuit for unlocking the lock shown in FIG. 1.

The combination switch 66, partially illustrated in FIGS. 1 and 3 as switch elements 74, 76 and 78, is shown more completely in the electrical schematic of FIG. 4. Each of the switch elements 74, 76 and 78 includes twelve contacts 80 arranged in a circle around a central rotating contact arm 82. One of the contacts 80 is wired to the center connection of the contact arm in the next switch element so that the switch elements are all wired in series when the contact arms 82 of all three switch elements are in contact with the correct contact 80. The centers of the arms 82 are connected to a knob (not shown) on the exterior of the lock body 32 to enable the position of the contact arms to be adjusted by the user of the lock.

In use, the person who knows the combination will set each of the three knobs attached to the three arms 82 to the correct position shown in FIG. 4, corresponding to the right combination. He then connects a battery pack 84 containing the battery 62 to the connector 64 and pushes an "open" button connected to an "open" switch 86. Closing the "open" switch 86 completes the circuit from the battery 62, through a conductor 88, through the heater 60 and the closed "open" switch 86, through each of the switches 78, 76 and 74 in series and back to the battery 62 through the connector 64. When the Nitinol actuator 56 heats up to a temperature above its transition temperature, it moves the locking pin 46 against the curved steel spring 58 and the return spring 72 to the open position of the locking pin shown in FIG. 3. The pop-up springs 68 and 70 push the shackle up in the bores 34 and 36 in the lock body 32, whereupon the user will naturally release the "open" button. The shackle may now be removed completely from the lock body 32.

To relock the shackle in the lock body 32, the shackle 30 is merely reinserted in the bores 34 and 36 and pressed downward. A pair of corresponding bevels 90 and 92 on the full diameter portion of the locking pin 46 and on the ends of the legs 26 and 28 cooperate to cam the locking pin 46 to the left in FIG. 1 to allow the shackle legs 26 and 28 to pass the locking pin 47. When the notches 42 and 44 are aligned with the reliefs 48 and 50, the locking pin will snap to the right to the locked position shown in FIG. 1 under the influence of the curved steel spring 58 and the return spring 72.

A circuit breaker 94 may be inserted into the conductor to prevent excess power from being applied to the heater 60 by use of the wrong battery, which could burn out the heater and thereby make the lock impossible to open. Preferably, the circuit breaker is the self-resetting variety that automatically resets itself after the breaker 94 has cooled down.

Figure 5:
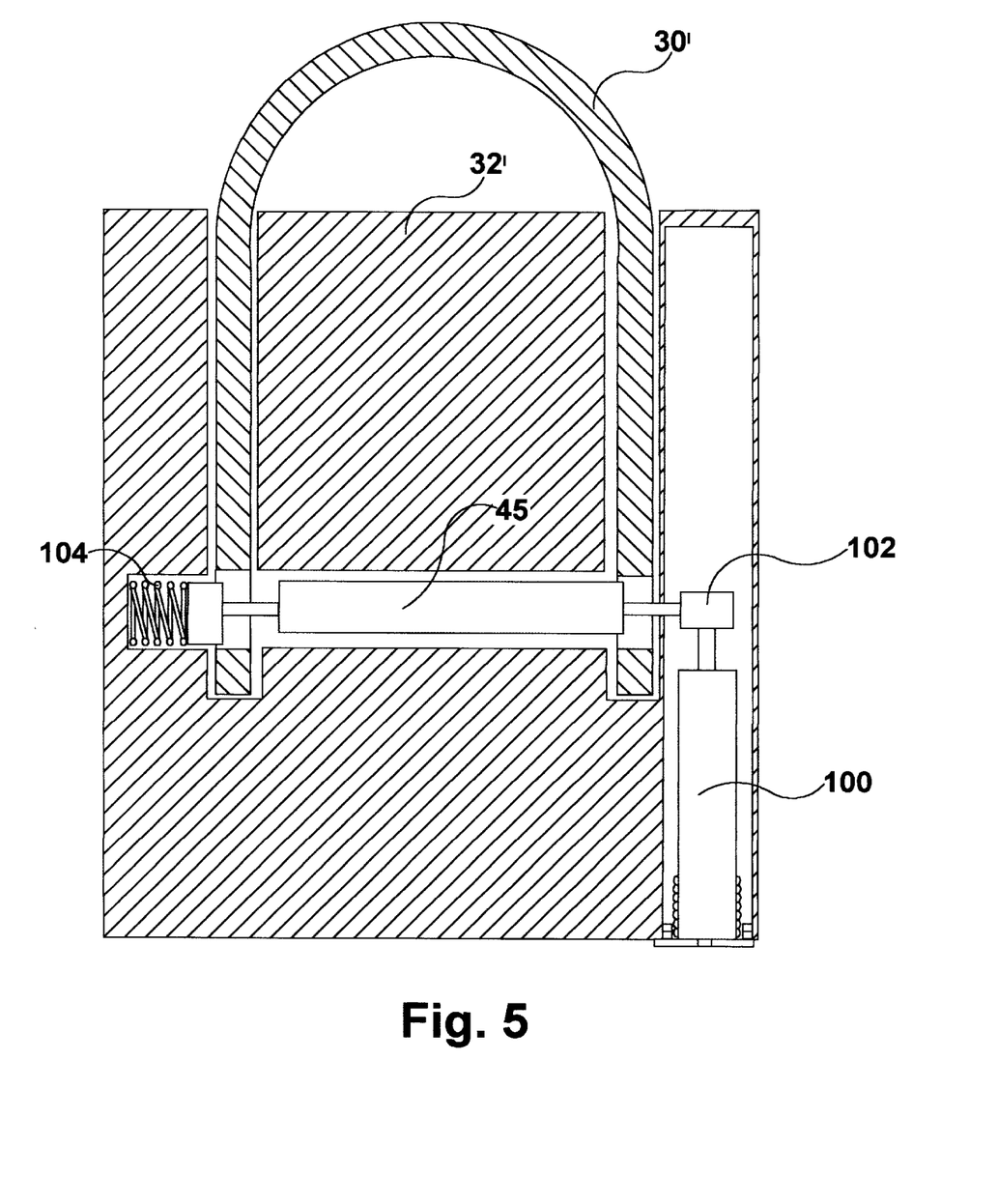
FIG. 5 is a sectional elevation of a second embodiment of a padlock according to this invention.

A second embodiment of a padlock according to this invention, shown in FIG. 5, includes a lock body 32', a shackle 30' and a locking pin 45 which are identical to those shown in FIGS. 1–3. The embodiment of FIG. 5, however, is designed to be opened by a conventional lock tumbler 100 operated by a conventional key (not shown.) Rotation of the right key in the tumbler assembly 100 will rotate a cam 102 against which the locking pin 45 is pressed by a spring 104. Rotating the cam 102 against the end of the locking pin 45 pushes the pin to the left in FIG. 5 to an unlocked position, releasing the shackle 30' for removal from the lock body 32'.

Figure 6:
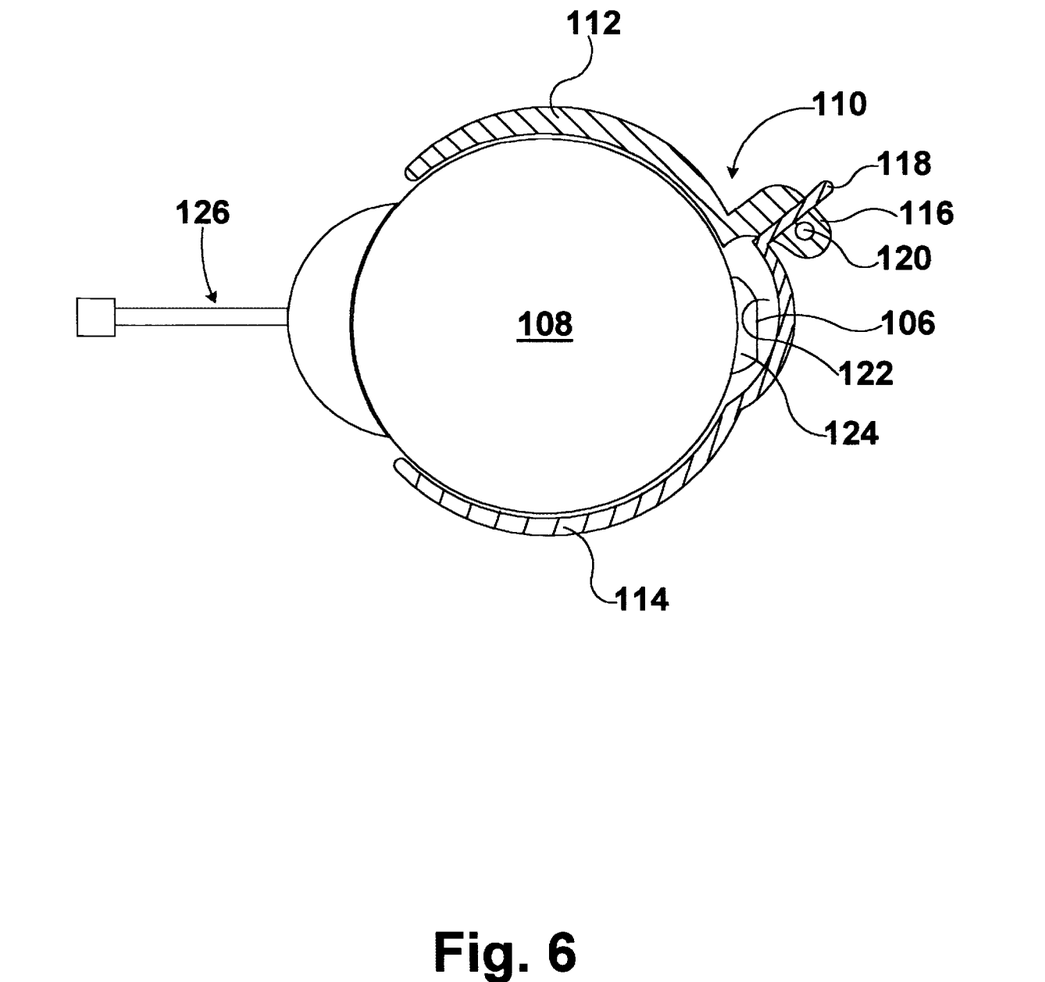
FIG. 6 is a sectional elevation of an automobile ignition lock cover in accordance with this invention, in place on an automobile or truck steering column.
Figure 7:
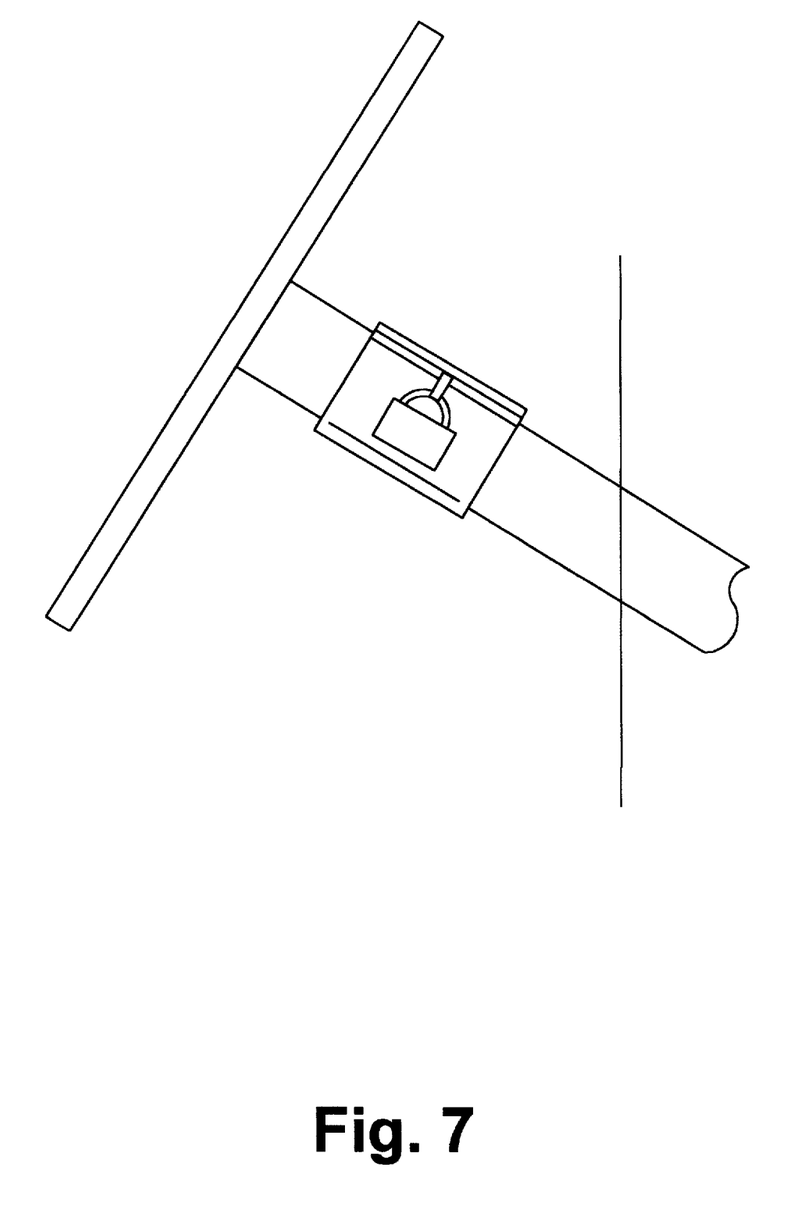
FIG. 7 is an elevation of the steering column ignition lock shown in FIG. 6, secured with a padlock.
Figure 8:
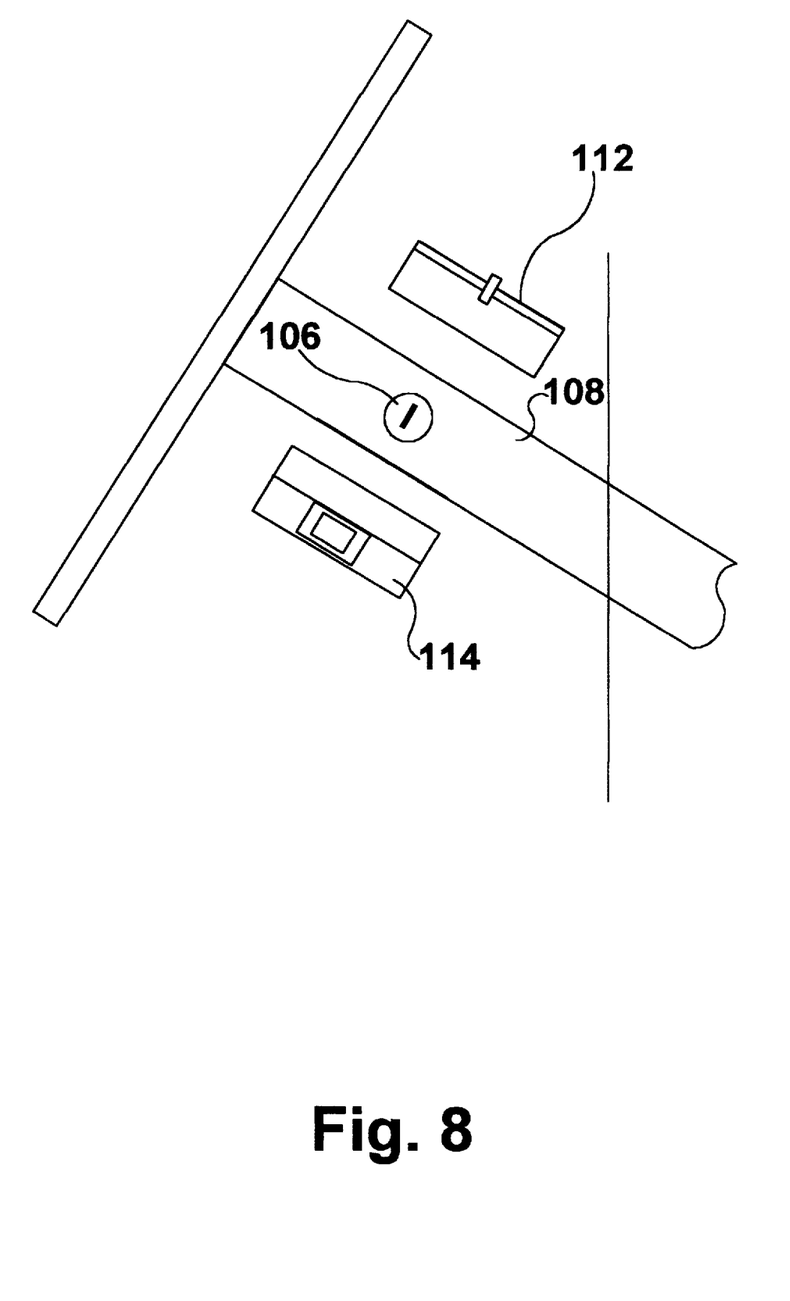
FIG. 8 is an elevation from the same perspective as FIG. 7, showing the steering column ignition lock of FIG. 6 in an unlocked and separated position.

Turning now to FIGS. 6 and 7, an automobile and truck steering column ignition lock cover is shown for securing over the ignition lock 106 on the steering column 108 of a truck or automobile to prevent access by a thief to the ignition lock. The steering column ignition lock cover includes a curved cylindrical clamshell type sleeve 110 having a top bracket 112 and a bottom bracket 114, connected together by an apertured hasp 116 on the top bracket engaged in a slotted tongue 118 on the bottom bracket. The aperture 120 in the hasp 116 receives a shackle of a padlock, such as the padlock shown in FIG. 1, to secure the two brackets of the sleeve 110 together on the steering column over the ignition lock.

A bump 122 is formed in the lower bracket 144 to accomodate the bulge 124 usually present in the steering column 108 where the ignition lock is mounted. The projection of the ignition lock mounting bulge 124 into the bump 122 prevents the ignition lock cover from being slid down the steering column to gain access to the ignition lock. The two brackets 112 and 114 are held securely on the steering column by the hasp 116 engaged in the slot in the tongue 118, so there is no need to connect the free ends of the brackets together with a hinge, and leaving them unconnected avoids the necessity of providing an opening to accomodate the turn signal stalk 126 which is normally placed on the steering column opposite the ignition lock.

Obviously, numerous modifications and variations of the preferred embodiments disclosed herein will become obvious to those skilled in the art. Accordingly, it is expressly to be understood that these modifications and variations, and the equivalents thereof, may be practiced while remaining within the spirit and scope of my invention as defined in the following claims, wherein

I claim:

1. A method of releasably securing a hasp, having a slotted tongue and an apertured member sized to be received in said tongue slot, in a closed position with a padlock secure against opening by cutting or breaking said padlock with common lock breaking tools, comprising:

closing said hasp by inserting said apertured member through said slot in said tongue;

inserting a primarily monolithic Nitinol shackle on said padlock through said aperture of said member;

pressing said Nitinol shackle in a pair of bores in a lock body of said padlock so that both ends of said shackle are within said lock body; and latching said shackle in a closed position in said lock body with a catch.

2. A method as defined in claim 1, further comprising:

unlatching said shackle for movement to an open position by releasing said catch from said shackle;

moving said shackle in said bores to a position in which at least one end of said shackle is out of said bore; and removing said shackle from said aperture for movement of said member clear of said tongue to an opened position.

3. A method as defined in claim 2, wherein:

unlocking said lock includes energizing an electrical heater element and applying heat from said heater to a Nitinol actuator coupled to said catch, thereby causing said Nitinol actuator to undergo a change of state and operatively exert a force on said catch to release said catch from said shackle.

4. A method as defined in claim 3, wherein:

energizing said electrical heater element includes entering a multi-digit number in a series of multi-digit switches, and generating a signal from said multi-digit switches to an "open" switch to complete a circuit from a source of electrical energy to said electrical heater element.

5. A method as defined in claim 4, wherein:

said heater element is disposed in intimate contact with said Nitinol actuator.

6. A method as defined in claim 4, wherein:

said source of electrical energy is an electric storage battery having a connector adapted to connect to a connector on said lock body.

7. A method as defined in claim 3, further comprising:

exerting a resilient force on said Nitinol actuator in the direction opposite to said force exerted by said Nitinol actuator to restore said Nitinol actuator to an unactuated configuration after said actuator cools down below the transition temperature of said Nitinol and enables said catch to re-engage said locking member.

8. A method of preventing access to an automobile steering column ignition lock for securing an automobile from theft, comprising:

locking said ignition lock of said automobile with an ignition lock key;

covering said ignition lock with a cover; and locking said cover in a closed position over said ignition lock with a lock having a primarily solid monolithic Nitinol shackle.

9. A method of preventing access to an automobile steering column ignition lock as defined in claim 8, wherein:

said cover includes two clamshell halves of a steering column sleeve.

10. A method of preventing access to an automobile steering column ignition lock as defined in claim 9, further comprising:

connecting said two clamshell halves of said steering column sleeve at one side and leaving the other side open to accomodate a turn indicator stalk.

11. A method of locking, comprising;

inserting a shackle of a lock through a staple of a hasp; and securing said lock shackle with a catch in a body of said lock such that said lock shackle can be released only by operating said lock to release said shackle and open said lock;

wherein said lock shackle is made primarily of solid monolithic Nitinol.

12. A method of locking as defined in claim 11, wherein said Nitinol is Type 55 Nitinol.

13. A method of locking as defined in claim 11, wherein said Nitinol is binary Nitinol.

14. A method of locking as defined in claim 11, further comprising:

securing both ends of said shackle in said lock body independently with two catches which must both be released to open said lock.

15. A method of locking, comprising:

pressing a free end of a lock shackle into an opening in a body of said lock containing a catch;

engaging said free end of said shackle with a catch to secure said free end within said body of said lock;

wherein said lock shackle is primarily solid monolithic Nitinol.

16. A method of locking as defined in claim 15, further comprising:

capturing a staple of a hasp within said lock shackle before securing said free end of said shackle within said body to lock said hasp in a closed position.

17. A method of locking as defined in claim 16, wherein:

said hasp is part of a cover member covering an automotive key slot of a motor vehicle ignition lock tumbler, wherein said lock must be removed to gain access to said ignition lock tumbler, whereby said motor vehicle is more secure against theft by breaking said ignition lock by virtue of denial of access to said ignition lock to thieves.

18. A method of locking as defined in claim 15, further comprising:

holding said shackle in said lock body with said catch until said catch is released by a key.

19. A method of locking as defined in claim 18, wherein:

said catch is Nitinol and engages Nitinol surfaces of a notch in said shackle.

20. A method of locking as defined in claim 15, further comprising:

passing said free end of said shackle through an opening in a member to be secured before engaging said free end of said shackle in said lock body.

* * * * *